United States Patent
Aldrich et al.

(10) Patent No.: US 7,304,288 B2
(45) Date of Patent: Dec. 4, 2007

(54) LASER PULSE COUNTER

(75) Inventors: Robert C. Aldrich, King George, VA (US); Wesley J. Marshall, Wilmington, DE (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 295 days.

(21) Appl. No.: 11/178,664

(22) Filed: Jul. 6, 2005

(65) Prior Publication Data

US 2007/0008205 A1    Jan. 11, 2007

(51) Int. Cl.
H01J 40/14    (2006.01)
H03M 1/12    (2006.01)

(52) U.S. Cl. ............................ 250/214 R; 341/155
(58) Field of Classification Search ............... 250/207, 250/214 VT, 214 R; 341/155
See application file for complete search history.

(56) References Cited

U.S. PATENT DOCUMENTS

| | | | | |
|---|---|---|---|---|
| 3,598,974 A | * | 8/1971 | Lincoln | 708/102 |
| 3,927,480 A | | 12/1975 | Robertsson | 35/25 |
| 4,428,050 A | * | 1/1984 | Pellegrino et al. | 250/372 |
| 4,870,366 A | * | 9/1989 | Pelletier | 327/117 |
| 5,343,285 A | | 8/1994 | Gondrum et al. | 356/28.5 |
| 5,837,918 A | | 11/1998 | Sepp | 89/1.11 |
| 5,999,549 A | | 12/1999 | Freitag et al. | 372/38 |
| 6,252,232 B1 | * | 6/2001 | McDaniel et al. | 250/369 |
| 6,324,196 B1 | | 11/2001 | Désor | 372/30 |
| 6,355,921 B1 | * | 3/2002 | Staton et al. | 250/207 |
| 6,363,648 B1 | | 4/2002 | Kranich et al. | 42/117 |
| 6,673,063 B2 | * | 1/2004 | Brett | 606/10 |
| 2004/0098070 A1 | * | 5/2004 | Mohr et al. | 607/89 |

* cited by examiner

*Primary Examiner*—John R. Lee
(74) *Attorney, Agent, or Firm*—Gerhard W. Thielman, Esq.; Scott R. Boalick, Esq.

(57) ABSTRACT

Pulses of optical radiation are counted by a pulse counter in a way representative of its effects on tissue. An analog to digital converter digitizes detected optical radiation pulses and an integrator integrates the digitally detected pluses. The integrator has a time constant characteristic sufficient to combine digitally detected pluses that are close enough together so that they are effectively one pulse with respect to tissue exposure limits. The integrator can be programmable to a particular time constant based on a thermal confinement duration of human tissue and wavelength of laser pulses. A counter circuit counts pulses, and a display displays the counted pulses. A capture circuit enables counting the number of pulses occurring within a capture duration by the counter circuit. The analog to digital converter can be configured to a sensitivity.

20 Claims, 5 Drawing Sheets

LASER PULSE COUNTER

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The present invention relates to a pulse counter and, more particularly, relates to a pulse counter for measuring optical radiation pulses considering the thermal confinement duration of tissue.

BACKGROUND

In the field of laser safety, laser hazard evaluations are performed to compare laser output parameters against known safety limits to determine the potential for hazardous exposure to optical radiation. Mathematical models have been created to aid in laser hazard evaluations. Because of physiological mechanisms within the eye, multiple laser pulses that occur within a certain time ($t_{min}$, known as the thermal confinement duration of tissue) are biologically treated as single laser pulses within these mathematical models.

Historically, most lasers that produced multiple laser pulses did so at regular intervals, so that the number of pulses emitted in a period of time could easily be determined by simply multiplying the pulse repetition rate by the length of exposure. In recent years, however, more and more laser systems have been created that emit multiple laser pulses at irregular intervals in an effort to transfer information from one point to another. An example of this is the Marine Corps/Army MILES laser weapon simulators. These lasers are used for force-on-force training to simulate conventional weapons. Marines and Soldiers wear vests that detect laser energy pulses that are coded by varying the number and timing of pulses. These MILES codes can represent user ID, weapon type, and the kill or near-miss severity of a simulated hit. Since devices like these do not subscribe to the traditional pulsing techniques used previously, determining the number of pulses emitted during an exposure has been very difficult to determine.

SUMMARY

The present invention provides a laser pulse counter that allows a user to determine a number of pulses emitted, regardless of any timing regularity. The laser pulse counter accounts for common values of the thermal confinement duration of tissue $t_{min}$. The laser pulse counter will count pulses for the most commonly needed exposure durations, and will count pulses for a capture duration. The laser pulse counter has an automatic trigger mode that prohibits the capture timer from starting until the unit receives its first pulse. The laser pulse counter can be used as a traditional frequency counter by selecting a continuous capture duration of one second. The laser pulse counter has a variable sensitivity to compensate for various laser pulse detectors and can also be used to sort the number of pulses of various energy levels that exist with some irregular pulsed laser systems.

In one implementation, a pulse counter counts laser pulses using an analog to digital converter and an integrator. The integrator receives laser pulses and has a sample duration. The sample duration corresponds to the thermal confinement duration of human tissue and a wavelength of a laser to be tested. The integrator outputs a single output pulse for a contiguous series of the input pulses that occur no further apart than the sample duration. The integrator can be programmed to a desired sample duration based on a kind of human tissue and wavelength of laser pulses. A capture circuit counts pulses, and a display displays the counted pulses. A counter circuit enables counting the number of pulses occurring within a capture duration by the counter circuit. The analog to digital converter can be configured to sensitivity.

The details of the preferred embodiments of the invention will be readily understood from the following detailed description when read in conjunction with the accompanying drawings.

DETAILED DESCRIPTION

Figure 1:
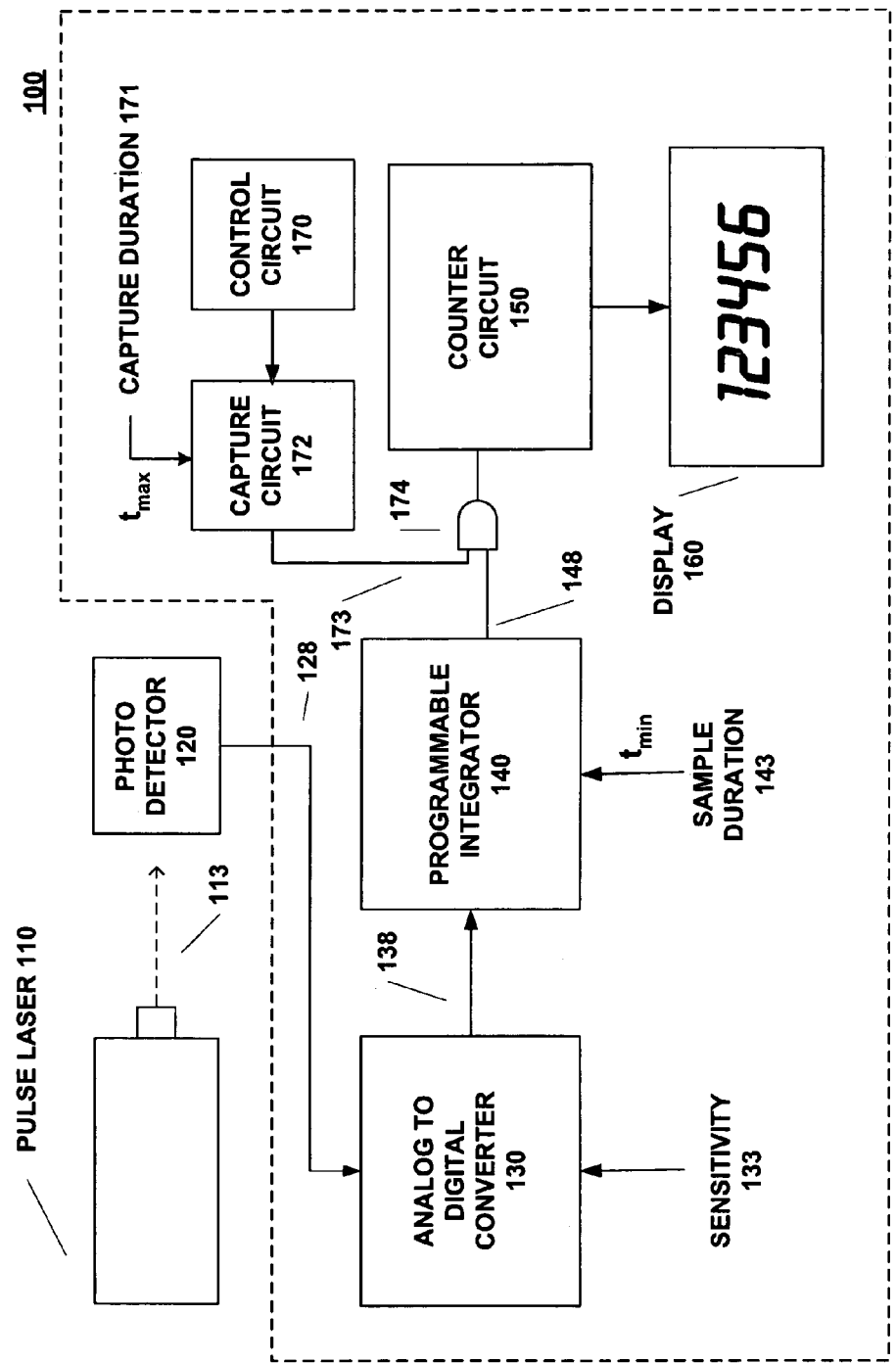
FIG. 1 illustrates an exemplary block diagram of a pulse counter.

FIG. 1 illustrates a block diagram of the pulse counter 100. To determine the potential hazards associated with exposure to pulsed optical radiation, the pulse counter 100 is capable of determining the number of pulses occurring within an exposure or capture duration. An integrator 140 combines pulses which are close enough together that they are effectively one pulse with respect to tissue exposure limits.

A pulse laser 110 emits pulsed optical radiation 113 of a particular wavelength. The pulses of optical radiation are detected by a photo detector 120. The photo detector is any detector capable of detecting optical radiation or laser pulses. An analog to digital converter 130 converts the analog signal 128 representative of the optical radiation pulses into digital input pulses 138.

A programmable integrator 140 is configurable to a sample duration 143 of $t_{min}$. A time constant of the programmable integrator 140 corresponds to this sample duration 143. The programmable integrator 140 outputs a single output pulse for a contiguous series of the input pulses that occur no further apart than the selected sample duration 143. A range of sample durations 143 for selection is preferred to accommodate different test constraints such as different tissue parameters and different wavelengths of optical radiation. A switch may be used to select among a plurality of sample durations 143. One sample duration choice on the switch includes a sample duration of effectively zero but in actuality equal to the effective propagation time through the circuitry. In the exemplary embodiment, the propagation time through the analog to digital converter 130 is approximately 500 nanoseconds.

Because of physiological mechanisms within human tissue such as the eye, multiple laser pulses that occur within a certain time (known as $t_{min}$) are biologically treated as single laser pulses within these mathematical models. This certain length of time ($t_{min}$) is the thermal confinement duration of tissue which is represented as the sample duration 143 of the integrator 140. By selecting the sample duration 143, the integrator 140 is programmed to have a time constant characteristic sufficient to combine sensed laser pluses that are close enough together that they are effectively one pulse with respect to optical radiation exposure limits of the tissue.

The analog to digital converter 130 is configurable to a sensitivity 133 in the preferred embodiment. A sensitivity 133 can be selected to accommodate the different sensitivities of various kinds of laser pulse detectors. A variable sensitivity 133 can also be used to sort the number of pulses of various energy levels that exist with some irregular pulsed laser systems.

A control circuit 170 triggers a capture circuit 172 to allow counting in a counter circuit 150. A counter circuit 150 counts pulses from the programmable integrator 140. A display 160 connects to the counter 150 and digitally displays the counted pulses.

The capture circuit 172 allows counting in the counter circuit 150 only during the capture duration. This capture duration is the duration of exposure to optical radiation to be considered in a test. The displayed pulses represent those during this capture duration. An enable signal 173 output of the capture circuit 172 is gated by an AND gate 174 to begin counting pulses 148 from the programmable integrator 140. The control circuit 170 initiates the capture based on a trigger initiated either upon operation of a start button in a manual trigger mode or upon the presence of a first pulse initiated by level detection in an automatic trigger mode.

The capture circuit 172 allows counting in the counter circuit 150 only during the selected capture duration 171 of $t_{max}$. A selected capture duration of 0.25 seconds is the normal time used when determining eye hazard from visible laser radiation due to the natural aversion response of the eye. A person exposed to an extremely bright light will typically either blink or look away in 0.25 seconds. A capture duration 171 of 1 second can be selected to use the pulse counter as a traditional frequency counter.

The capture circuit 172 is useful because a small duration is difficult to take manually with a stopwatch. Frequency counters count pulses per time, while the present inventions count pulses during the first $t_{max}$ seconds. The capture circuit 172 allows the pulse counter of the present inventions to act as a discrete event counter.

A switch may be used to select among a plurality of capture durations 171, while a potentiometer may be used to set the sensitivity 133. A potentiometer, however, can be used to also set the capture duration 171 and even the sample duration 143, the disadvantage being not knowing precisely what the setting is for the respective capture duration 171 or sample duration 143 without means of special indicator or other display.

Because light is often defined as visible and the laser pulse counter of the present inventions will work with visible or non-visible forms of optical radiation or laser pulses, we refer to light as optical radiation. And because not all optical radiation is by laser, the pulse counter of the present inventions will also work with broadband flashing light as an alterative to a pulsed laser. A television remote control is example of broadband pulsed radiation.

Figure 2:
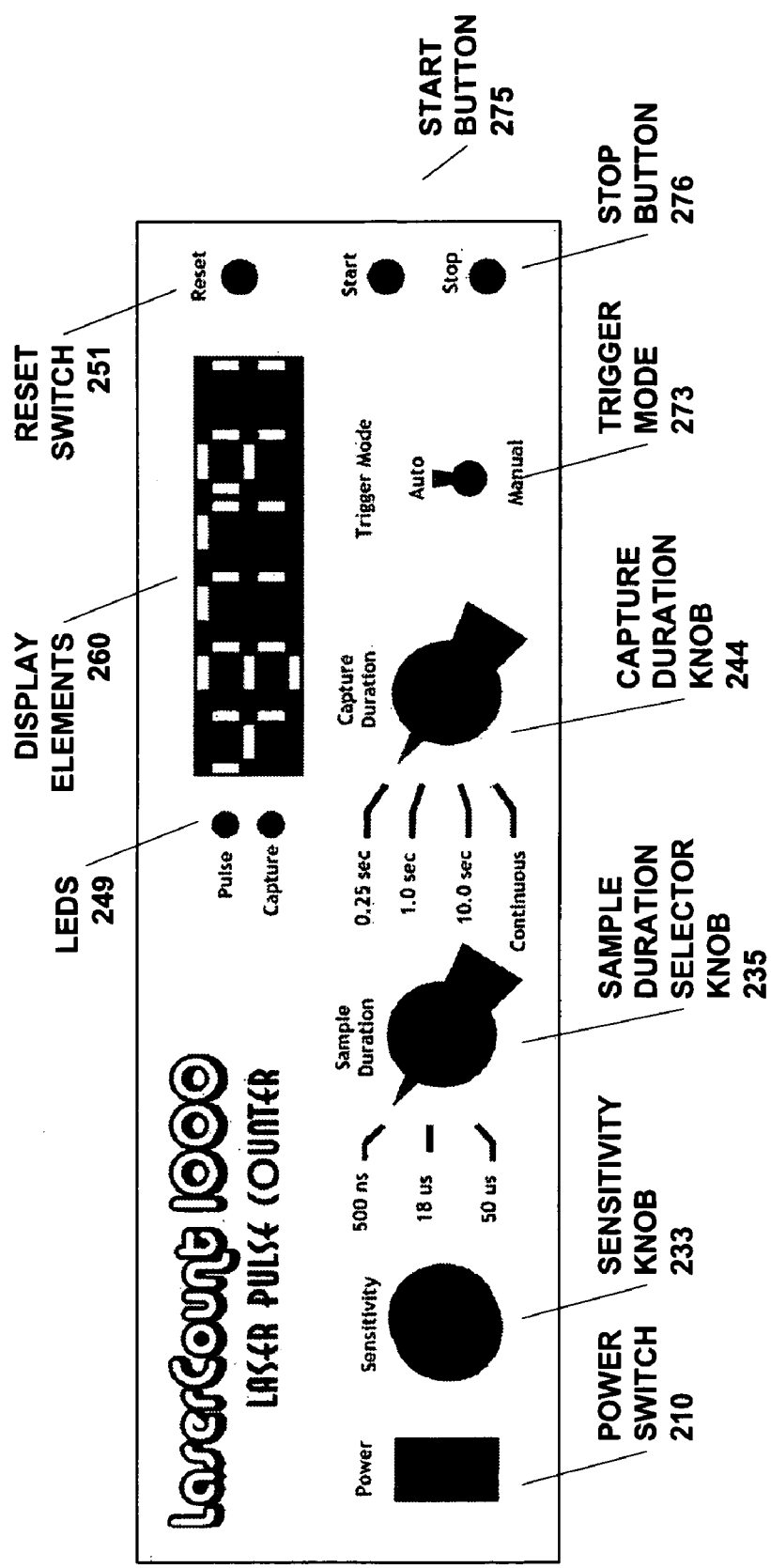
FIG. 2 illustrates a diagram of a front of an exemplary cabinet for the pulse counter of FIG. 1.

FIG. 2 illustrates a diagram of a front of an exemplary cabinet for a pulse counter. Controls on the front of the cabinet allow selection of the configurable durations and parameters and provide for general operation of the pulse counter.

A sample duration knob 235 allows for selection of the sample duration. The sample duration is selected among three predetermined choices: 500 nanoseconds, 18 microseconds and 50 microseconds. From the American National Standards Institute (ANSI) standard ANSI Z136.1-2000, the thermal confinement duration of tissue $t_{min}$ is 18 us for wavelengths between 400 nm and 1050 nm and is 50 us for wavelengths between 1050 nm and 1400 nm. These wavelengths represent the most common lasers.

One sample duration choice on the switch includes a small sample duration which removes the integrator 140 from the circuit path. This small sample duration is equal to the propagation time of the circuits which in this case is a propagation time of the analog to digital converter 130 of approximately 500 nanoseconds. This 500 nanoseconds is the fastest separation between pulses that the analog to digital converter circuit can differentiate. Essentially, in this mode, the unit does not average over time.

A capture duration knob 244 allows for selection of the capture duration. The capture duration is selected among four predetermined choices: 0.25 seconds, 1.0 seconds, 10.0 seconds and continuous. A capture duration of 0.25 seconds is the normal time used when determining eye hazard from visible laser radiation due to the natural aversion response of the eye. A person exposed to an extremely bright light will typically either blink or look away in 0.25 seconds. A capture duration of 1 second can be selected to use the pulse counter as a traditional frequency counter.

A sensitivity knob 233 allows for selection of a variable sensitivity using a potentiometer. A sensitivity can be selected to accommodate different sensitivities of various kinds of laser pulse detectors. A variable sensitivity can also be used to sort the number of pulses of various energy levels that exist with some irregular pulsed laser systems.

A power switch 210 controls power supply power supplied to the pulse counter circuitry. The display elements 260 show the user the number of pulses counted by the laser pulse counter of the present inventions. Pulse and capture LEDs 249 are provided on the front of the cabinet of the pulse counter. The pulse LED (pulse light emitting diode) flashes in accordance with pulses output to the counter from the integrator. The capture LED (capture light emitting diode) indicates when the pulse counter is capturing these pulses.

A trigger mode switch 273 selects between an automatic trigger mode and a manual trigger mode. In the manual trigger mode, a start button 275 is pressed by the user to start counting and a stop button 276 is pressed by the user to stop counting. In the automatic trigger mode, the pulse counter circuitry decides when to start counting. The stop button 276 functions in both automatic trigger mode and manual trigger mode. The reset switch 251 resets the pulse counter including its counter logic, control logic, and timer. When the reset switch 251 is pressed, the count on the display elements 260 go to zero.

Figure 3:
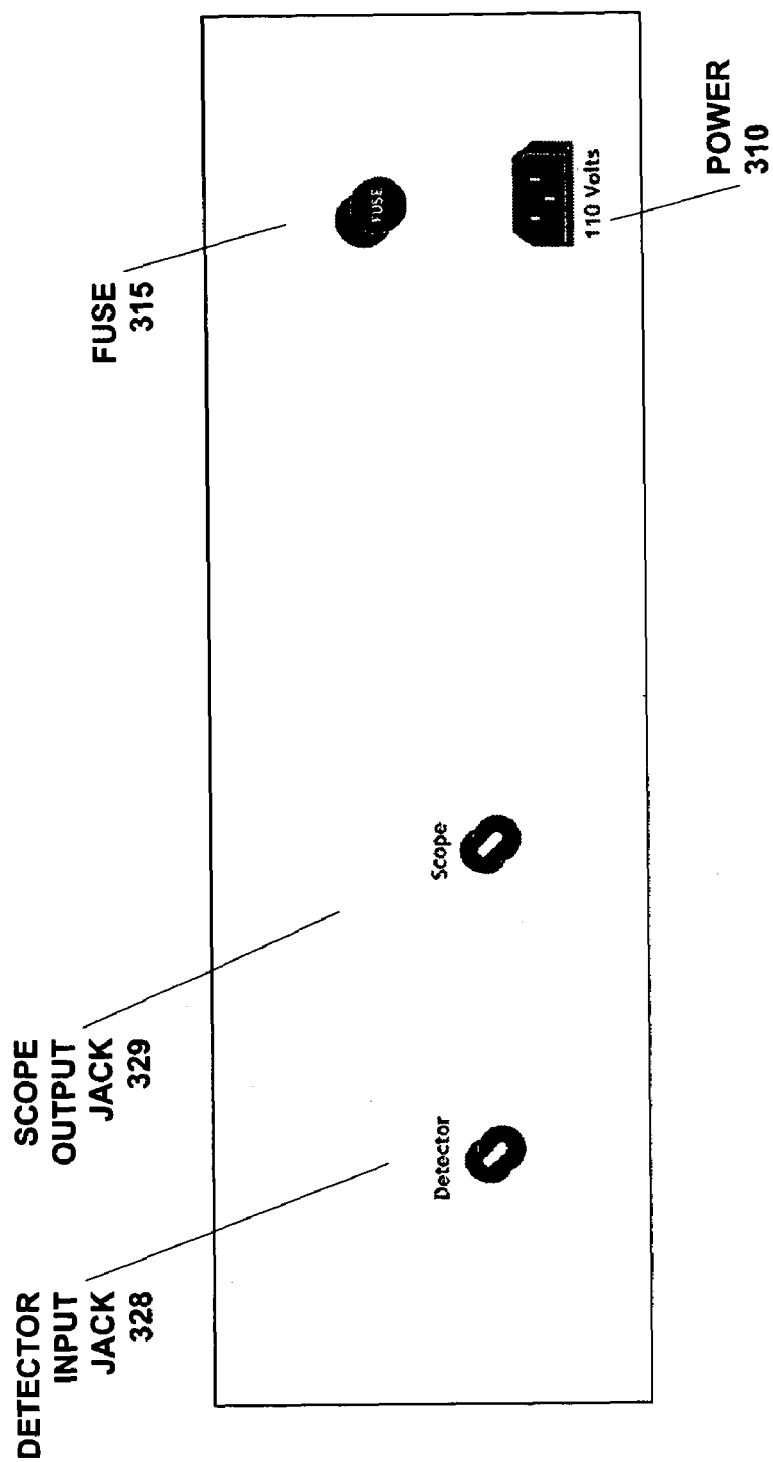
FIG. 3 illustrates a diagram of a back of an exemplary cabinet for the pulse counter of FIG. 1.

FIG. 3 illustrates a diagram of a back of an exemplary cabinet for a pulse counter. A detector input jack 328 connects and external photo detector to an input of the analog to digital converter. A scope output jack 329 is connected to the same node as the detector input jack 328 and provides convenience to user for monitoring the output of the photo detector on an oscilloscope. Preferably the detector input jack 328 and the scope output jack 329 are made of BNC type jacks.

Figure 4:
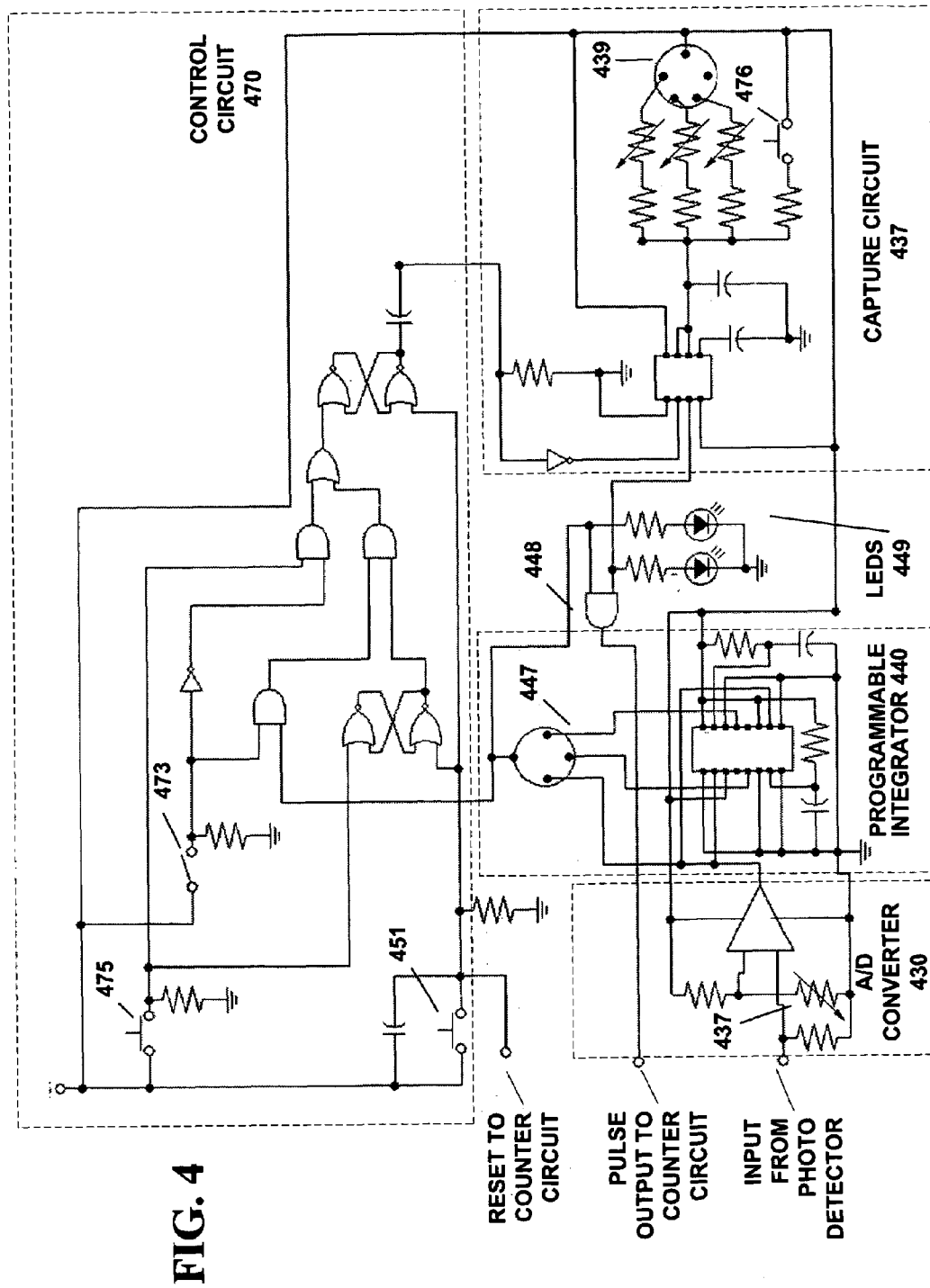
FIG. 4 illustrates an exemplary detailed circuit diagram of a control logic and timer for the pulse counter of FIG. 1.

FIG. 4 illustrates an exemplary detailed circuit diagram of a control logic and timer for the pulse counter. An analog to digital converter 430 receives an input from the photo detector. The analog to digital converter 430 may be made of an operational amplifier type LM311 having a variable resistor 437 in the form of a potentiometer for setting its sensitivity. The analog to digital converter 430 is effectively an analog level detector that receives an analog input signal and compares it to user controlled analog signal. The analog to digital converter 430 creates a digital high or low signal based on which analog signal is higher.

The programmable integrator 440 may be made of a 74123 retriggerable monostable multivibrator. A selector switch 447 allows selection among a plurality of sample duration. The retriggerable monostable multivibrator has two units in one package and thus allows more than one setting for the sample duration. The preferred construction of this integrator 440 is a digital integrator, an analog integrator could be used.

A capture circuit 437 contains a 555 timer integrated circuit having a capture duration set by a selector switch 439. The selector switch 439 selects between three different resistances and trimmed by trimming resistors. A stop button 476 is used by the user to manually stop the counting circuit.

A control circuit 470 contains a start button 475 and a reset button 451. A mode switch 473 selects between an automatic trigger mode and manual trigger mode. The control circuit 470 tells the capture circuit 437 when to begin.

Pulse and capture LEDs 449 flash in accordance with pulses output to the counter from the programmable integrator circuit 440 and the capture circuit 437. The pulse LED flashes whenever the integrator emits a pulse (regardless as to whether the device is counting it). This helps the user to set the sensitivity. The capture LED is lit while the device is counting the pulses from the integrator. The device is counting the pulses from the integrator while the counter circuit is enabled via the AND gate 448. The capture circuit creates an enable signal for the counter circuit through the AND gate 448. The pulse output from the integrator circuit 440 is used to flash the pulse LED and the enable output from the capture circuit 437 is also used to light the capture LED.

Figure 5:
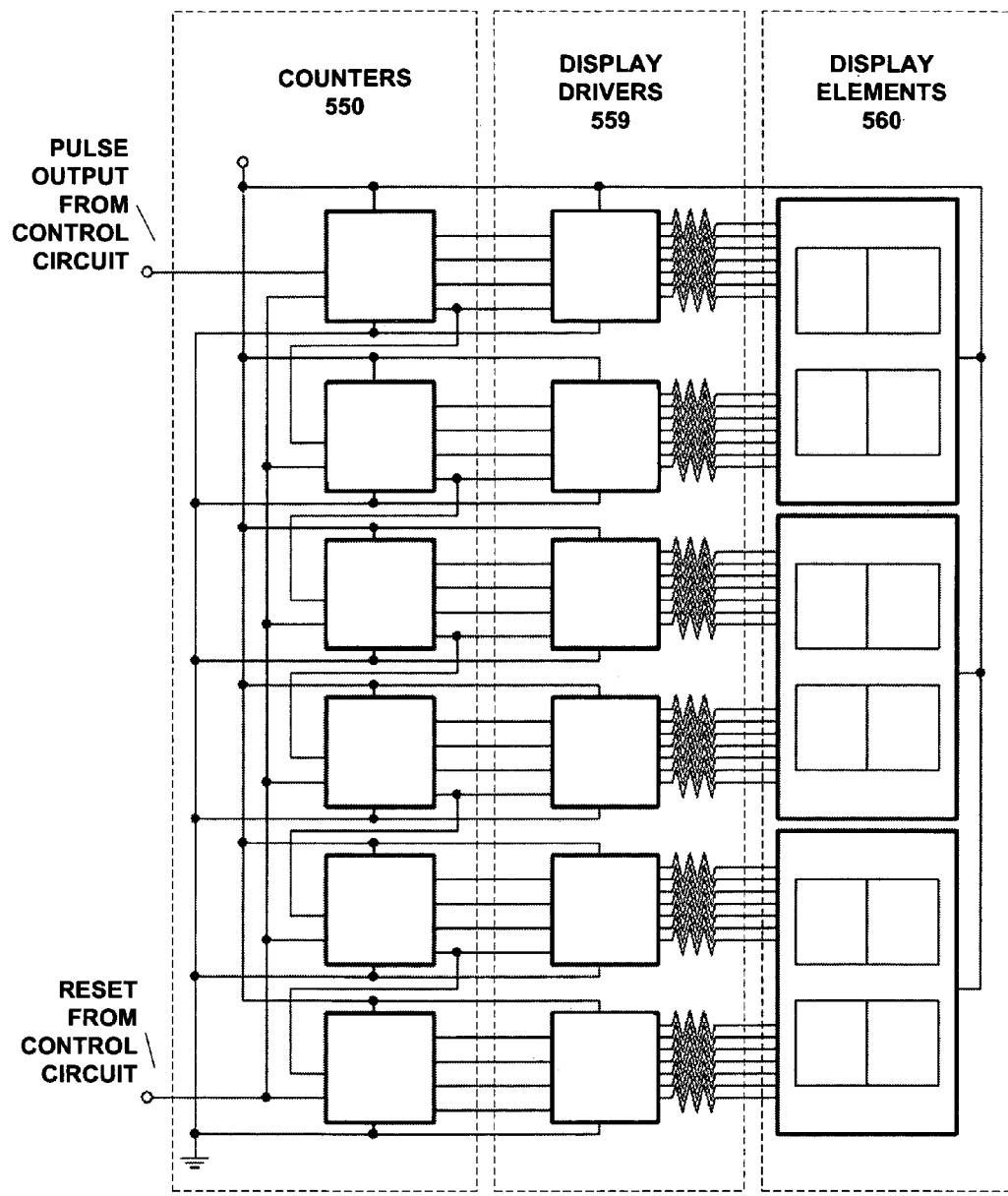
FIG. 5 illustrates an exemplary detailed circuit diagram of a counter circuit and display for the pulse counter of FIG. 1.

FIG. 5 illustrates an exemplary detailed circuit diagram of a counter circuit and display for the pulse counter. Digital counters 550 count pulses from the control circuit of FIG. 4. The digital counters 550 have their counter reset upon a reset signal from the control circuit of FIG. 4. The digital counters 550 may be made from a series of type 7490 integrated circuits. The display drivers 559 connected to the output of the digital counters 550 and provide current via resistors to display elements 560. The display drivers 559 may be made of type 7447 integrated circuits. The display elements 560 display the count on the front panel of the pulse counter.

While the pulse counter has been illustrated by the drawings as discrete digital circuitry, alternate constructions are possible. For instance a microprocessor implementation of the pulse counter subsequent to analog thresholding by an analog to digital converter is an alternative construction.

The pulse counter allows its user to determine the number of laser pulses, regardless of their timing regularity. Furthermore, the pulse counter accounts for the most common human tissue values of $t_{min}$ and can will count pulses for the most common required exposure durations. The pulse counter can have an automatic trigger mode that prohibits the capture timer from starting until the unit receives its first pulse.

Although the invention has been described and illustrated in the above description and drawings, it is understood that this description is by example only, and that numerous changes and modifications can be made by those skilled in the art without departing from the true spirit and scope of the invention. Although the examples in the drawings depict only example constructions and embodiments, alternate embodiments are available given the teachings of the present disclosure. Although the pulse counter has been created use with laser pulses, it can be used for other systems that produce pulses. For example, radio frequency (RF) pulse measurements can be made.

We claim:

1. A pulse counter for counting optical radiation pulses from a photodetector, comprising:
   an analog to digital converter for receiving an analog signal from the photodetector and converting the analog signal to digital pulses;
   a programmable integrator for producing an output pulse in response to the digital pulses in a contiguous series within a sample duration;
   a capture circuit for providing a capture duration; and
   a counter circuit for counting the output pulse that occurs within the capture duration.

2. The pulse counter according to claim 1, wherein the analog to digital converter includes variable sensitivity for selecting energy level of the analog signal, the programmable integrator selects the sample duration from a plurality of sample durations, and the capture circuit selects the capture duration from a plurality of capture durations.

3. The pulse counter according to claim 1, wherein the programmable integrator includes a sample selector switch for selecting the sample duration from a plurality of sample durations.

4. The pulse counter according to claim 1,
   wherein the analog to digital converter includes variable sensitivity for selecting energy level of the analog signal.

5. The pulse counter according to claim 1, wherein the sample duration corresponds to the thermal confinement duration of tissue to the pulsed optical radiation.

6. The pulse counter according to claim 1, wherein the output pulse and the capture duration pass through an AND gate to the counter circuit.

7. The pulse counter according to claim 1, wherein the capture circuit includes a duration selector switch for selecting the capture duration from a plurality of capture durations.

8. The pulse counter according to claim 1, wherein the sample duration is 18 microseconds for a wavelength of the pulsed optical radiation between 400 nanometers and 1050 nanometers, and the sample duration is 50 microseconds for the wavelength between 1050 nanometers and 1400 nanometers.

9. The pulse counter according to claim 3, wherein one of the plurality of predetermined sample durations corresponds to a propagation time through the analog to digital converter.

10. The pulse counter according to claim 1, further comprising
    a display for displaying an output pulse count from the counter circuit; and
    a control circuit to trigger the capture circuit.

11. The pulse counter according to claim 9, wherein the propagation time is about 500 nanoseconds.

12. The pulse counter according to claim 10, wherein the capture duration corresponds to an eye's natural aversion response.

13. A pulse counter for counting radiation pulses from a photodetector, comprising:
- an analog to digital converter for receiving an analog signal from the photodetector and converting the analog signal to digital pulses;
- an integrator for combining the digital pulses separated by intervals sufficiently short to be effectively treated as one output pulse with respect to a tissue exposure limit;
- a capture circuit for providing a capture duration; and
- a counter circuit for counting the output pulse that occurs within the capture duration.

14. The pulse counter according to claim 13, wherein the intervals are within a sample duration.

15. The pulse counter according to claim 14, wherein the sample duration is 18 microseconds for a wavelength of the pulsed optical radiation between 400 nanometers and 1050 nanometers, and the sample duration is 50 microseconds for the wavelength between 1050 nanometers and 1400 nanometers.

16. The pulse counter according to claim 13, wherein the output pulse and the capture duration pass through an AND gate to the counter circuit.

17. The pulse counter according to claim 16, wherein the capture duration corresponds to an eye's natural aversion response.

18. The pulse counter according to claim 16, further comprising:
- a display operatively coupled to the counter circuit for displaying an output pulse count from the counter circuit; and
- a control circuit to trigger the capture circuit.

19. A pulse counter for counting laser pulses from a photodetector, comprising:
- an analog to digital converter for receiving an analog signal from the photodetector and converting the analog signal to digital pulses;
- an integrator operatively coupled to the analog to digital converter for receiving the digital pulses and having a sample duration, wherein, the sample duration corresponds to the thermal confinement duration of human tissue and a wavelength of a laser to be tested, and wherein the integrator outputs one output pulse in response to a contiguous series of the digital pulses that occur no further apart than the sample duration;
- a counter circuit operatively coupled to the integrator for counting output pulses therefrom; and
- a capture circuit operatively connected to the counter circuit for counting only the output pulses from the integrator that occur within a capture duration, wherein the capture duration corresponds to an exposure interval to optical radiation to be considered in a test.

20. A pulse counter for counting pulses from a photodetector, comprising:
- an analog to digital converter for receiving an analog signal from the photodetector and converting the analog signal to digital pulses, wherein the analog to digital converter includes variable sensitivity for selecting enemy level of the analog signal;
- a counter circuit operatively coupled to the analog to digital converter for counting the digital pulses; and
- a capture circuit operatively connected to cause the counter circuit for counting only the digital pulses that occur within a capture duration, wherein the capture duration corresponds to an eye's natural aversion response.

* * * * *